United States Patent [19]

Goodnight et al.

[11] 4,213,935
[45] Jul. 22, 1980

[54] APPARATUS FOR USE IN CONJUNCTION WITH BOILER FLUE GASES FOR GENERATING INERT BLANKETING GASES

[75] Inventors: Hershel E. Goodnight; Alan D. Witwer, both of Tulsa, Okla.

[73] Assignee: John Zink Company, Tulsa, Okla.

[21] Appl. No.: 916,767

[22] Filed: Jun. 19, 1978

[51] Int. Cl.² .............................................. B01J 7/00
[52] U.S. Cl. ................................... 422/111; 422/129; 422/182; 431/5; 431/202
[58] Field of Search ............... 422/168, 169, 176, 182, 422/183, 305, 111, 129; 431/5, 190, 202

[56] References Cited

U.S. PATENT DOCUMENTS

| | | | |
|---|---|---|---|
| 3,194,215 | 7/1965 | Barnes | 422/183 X |
| 3,215,503 | 11/1965 | Nessler | 422/111 X |
| 3,549,333 | 12/1970 | Tabak | 422/182 X |
| 3,672,808 | 6/1972 | Miyazaki | 431/190 X |
| 3,885,929 | 5/1975 | Lyon et al. | 422/169 X |
| 3,915,655 | 10/1975 | Grulich et al. | 422/182 X |
| 3,994,671 | 11/1976 | Straitz | 431/5 X |
| 3,997,294 | 12/1976 | Kriztler | 422/182 X |
| 4,101,632 | 7/1978 | Lamberti et al. | 431/5 X |

FOREIGN PATENT DOCUMENTS

| | | | |
|---|---|---|---|
| 1931647 | 1/1971 | Fed. Rep. of Germany | 431/5 |
| 2200702 | 7/1973 | Fed. Rep. of Germany | 431/202 |

Primary Examiner—Arnold Turk
Attorney, Agent, or Firm—Head & Johnson

[57] ABSTRACT

Apparatus for use in conjunction with boiler flue gases, for generating inert blanketing gases, for safety in the pumping out of hydrocarbons or other flammable liquids from tanks or containers, such as might be used on board ship while unloading liquid fuels, etc. The apparatus comprises a circular vessel with a vertical axes. Coaxial with the outer wall of the vessel is an inner refractory wall of lesser diameter, which houses a combustion zone. Liquid fuel is supplied under pressure axially at the top of the combustion zone and, with atomizer means, a spray of liquid fuel droplets is projected downwardly in the combustion zone. Flue gases from a boiler or similar source is supplied, along with combustion air from a blower, to a plenum upstream of the fuel spray. This provides a downgoing flame inside of the combustion chamber, which flows downwardly, past the bottom edge of the refractory wall, and upwardly in the annular space between the refractory wall and the vessel wall. A downward spray of water droplets from a plurality of nozzles in the annular space serves to clean and cool the hot gases, which flow upwardly in the annular space, past a demisting means, to the tank or other receiving device, which is to be filled with the blanketing gas.

10 Claims, 4 Drawing Figures

APPARATUS FOR USE IN CONJUNCTION WITH BOILER FLUE GASES FOR GENERATING INERT BLANKETING GASES

BACKGROUND OF THE INVENTION

1. Field of the Invention

This invention lies in the field of inert gas generators. More particularly, it concerns an inert gas generator which utilizes the products of combustion from a furnace or other source, along with a supply of fuel and combustion air, to generate inert blanketing gas with a selected minimum value of oxygen content.

2. Description of the Prior Art

Removal of flammable liquids from tanks, vessel holds, and the like, where the vapor-pressure of the liquid is less than atmospheric pressure, is typically accomplished by pump-out of the liquid from its containment. In such cases, as the liquid is withdrawn, a volume of gas at least equal to the volume of the withdrawn liquid must flow into the containment space to avoid less-than-atmospheric pressure within the containment volume.

If the entering gas is air, and in view of the flammable nature of the liquid, an explosive mixture of air and flammable vapor from the liquid is formed, and a great hazard exists. This hazard is particularly significant in marine transport of flammable liquids, particularly because the discharge of oils is accomplished "in-port". Also, because the oils discharged are flammable, regulations require that gases admitted to containing spaces for the oils be "inert". That is, their oxygen content is limited to 4%, where dry air contains approximately 21% oxygen. At 4% $O_2$, there is not sufficient oxygen to create an explosive condition within the containment space, such as it may be.

On shipboard, it would be possible to make use of Inert Gas Generators for supply of inert "blanketing gases", but such gases, produced by carefully-controlled combustion, demand large quantities of fuel which is an expensive, as well as an energy-wasteful practice. Simultaneously, it is required that there be certain fuel firing in the ship's boilers. However, because, with limited boiler firing, it is virtually impossible to prevent the presence of 8%–10% $O_2$ in the stack flue gases, it has not been possible to make use of the boiler stack flue gases for "blanketing", such as discussed, as a supplement to blanketing gases as produced by inert-gas generation at another point aboardship. Such use of boiler flue gases is, potentially, a big step toward fuels conservation in the provision of a required quantity of inert blanketing gases in avoidance of explosions as the cargo is moved to land-based containment.

SUMMARY OF THE INVENTION

It is the primary object of this invention to provide an inert gas generator for providing an inert blanketing gas, for safety in pump-out of hydrocarbons or other flammable liquids from tanks.

It is a still further object to provide an inert gas generator that can utilize, as a major part of its input, products of combustion which have higher than minimum oxygen content.

These and other objects are realized, and the limitations of the prior art are overcome in this invention by providing a cylindrical vessel, with its axis vertical. Concentric with the vessel wall is an internal wall of lesser diameter made of refractory material, which defines a combustion chamber. There is an air plenum at the top of the vessel, and means to atomize a liquid fuel in a spray of very fine droplets, downwardly inside of the refractory wall. Combustion air, and the products of previous combustion, are flowed into the combustion chamber, to burn the fuel.

The downwardly flowing flame passes outwardly under the bottom edge of the combustion chamber, and up through an annular space between the refractory wall and the outer wall of the vessel. A circular manifold in the annular space provides a plurality of nozzles forming a downward spray of water, which washes and cools the upflowing hot gases of the flame, which pass upwardly in the annular space past a demister, and outwardly of the vessel to another device, which is to receive the blanketing gas.

Liquid-level control means are provided to maintain a fixed level of water in the bottom of the tank, by controlling the draining of this water.

The flow of combustion air to the air plenum and the flow of fuel to the burner may be controlled in accordance with the percentage of oxygen measured in the outlet flow of gases from the vessel.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

This invention illustrates two systems, which show how it is possible to make use of a significant portion of boiler flue gases as a supplement to other gases, which are fuel-produced, with correspondingly reduced fuel demand, for production of inert blanketing gases in quantities as may be required. While two separate systems are shown, they both function in similar manners to prevent the presence of more than tolerable (4%) oxygen in the inert blanketing gases.

In the burning of essentially all hydrocarbon fuel, and for release of 910 btu lower heat value (LHV), air is the supply source for oxygen, and with it goes atmospheric nitrogen. The oxygen requirement for 910 btu LHV is 2 cubic feet, along with approximately 7.6 cubic feet of nitrogen. For each 910 btu's the products of combustion (gases) are 1 cubic foot of carbon dioxide, 2 cubic feet of water vapor, plus 7.6 cubic feet of nitrogen for a total of 10.6 cubic feet of oxygen-free gases when only theoretical oxygen (air) is admitted to the burning space. But, for chemical reasons, it is typical to admit an excess of air to the burning space, and this results in oxygen presence in the evolved gases.

The maximum oxygen content to be allowed for blanketing gases is 4%, and this represents 20% excess air. Therefore, the release of 910 btu's causes production of 1-$CO_2$, 2-$H_2O$, 0.4 $O_2$, and 9.1 $N_2$ or a total of 12.5 cubic feet of gases, which represents considerable volumetric improvement over the 10.6 cubic feet/910 btu's at theoretical (stoichiometric) conditions.

In fuels burning it is considered typical for some oxygen to be present in the combustion gases evolved, and, in operation at design rating (or close thereto) controls can nicely maintain a preferred oxygen content. However, it is virtually impossible to maintain oxygen content of combustion gases at drastically reduced rating (such as from 5% to 20%) for complete burning of the fuel.

Figure 1:
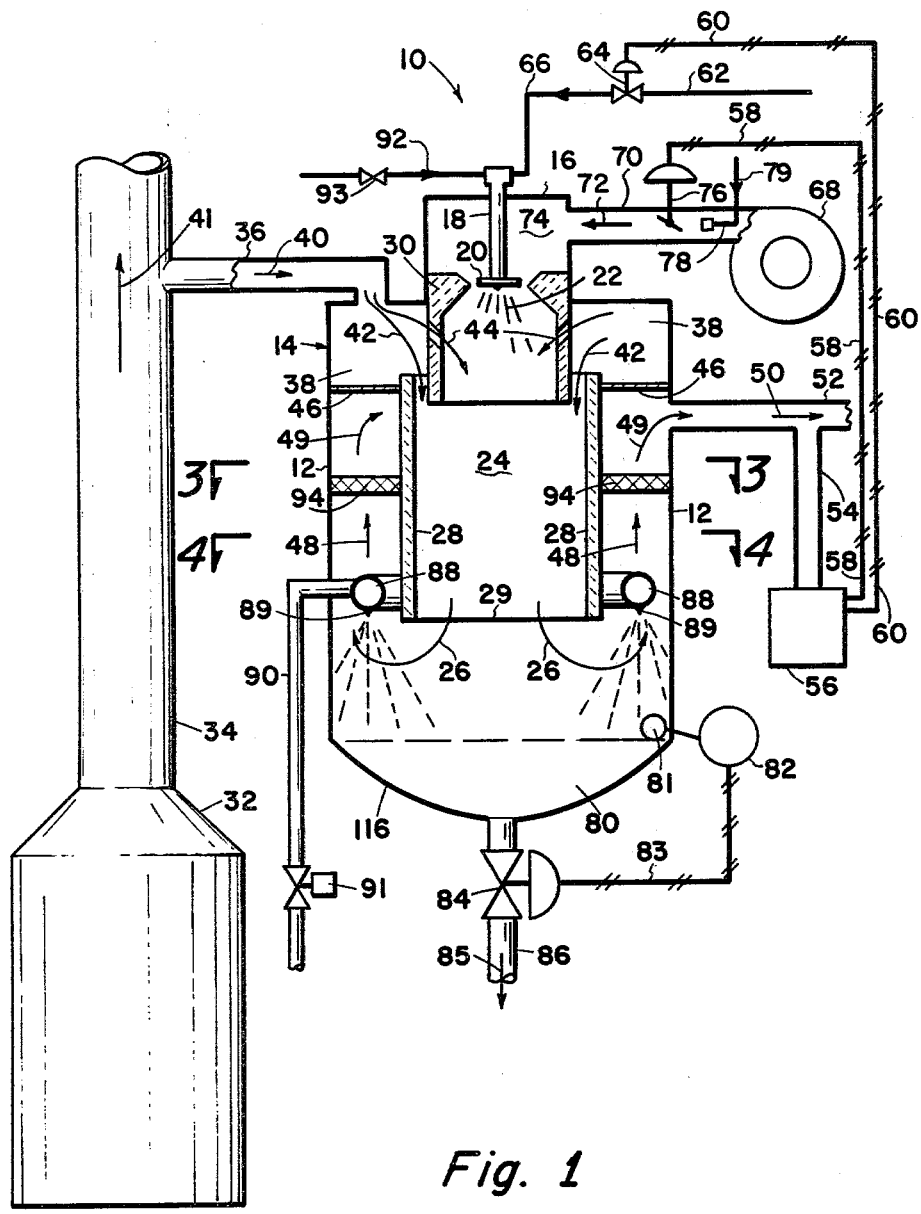
FIG. 1 illustrates one embodiment of the invention.

Referring now to the drawings and, in particular, to FIG. 1, there is illustrated one embodiment of the invention, which is designed to use the products of combustion, or flue gas, from a boiler, such as might be used on board a tanker, for example, where hydrocarbon oil is to be pumped out of the hold of the vessel and the space filled with a inert gas of oxygen content less than a certain minimum, such as 4%, for example.

The apparatus is indicated generally by the numeral 10. It comprises a vessel of circular cross-section and vertical axis, indicated generally by the numeral 14.

The vessel has an outer wall 12 and a base 116. Coaxial with the outer wall, and of lesser diameter, is a refractory wall 28, which is supported co-axial with the vessel and positioned near the top of the vessel.

Figure 2:
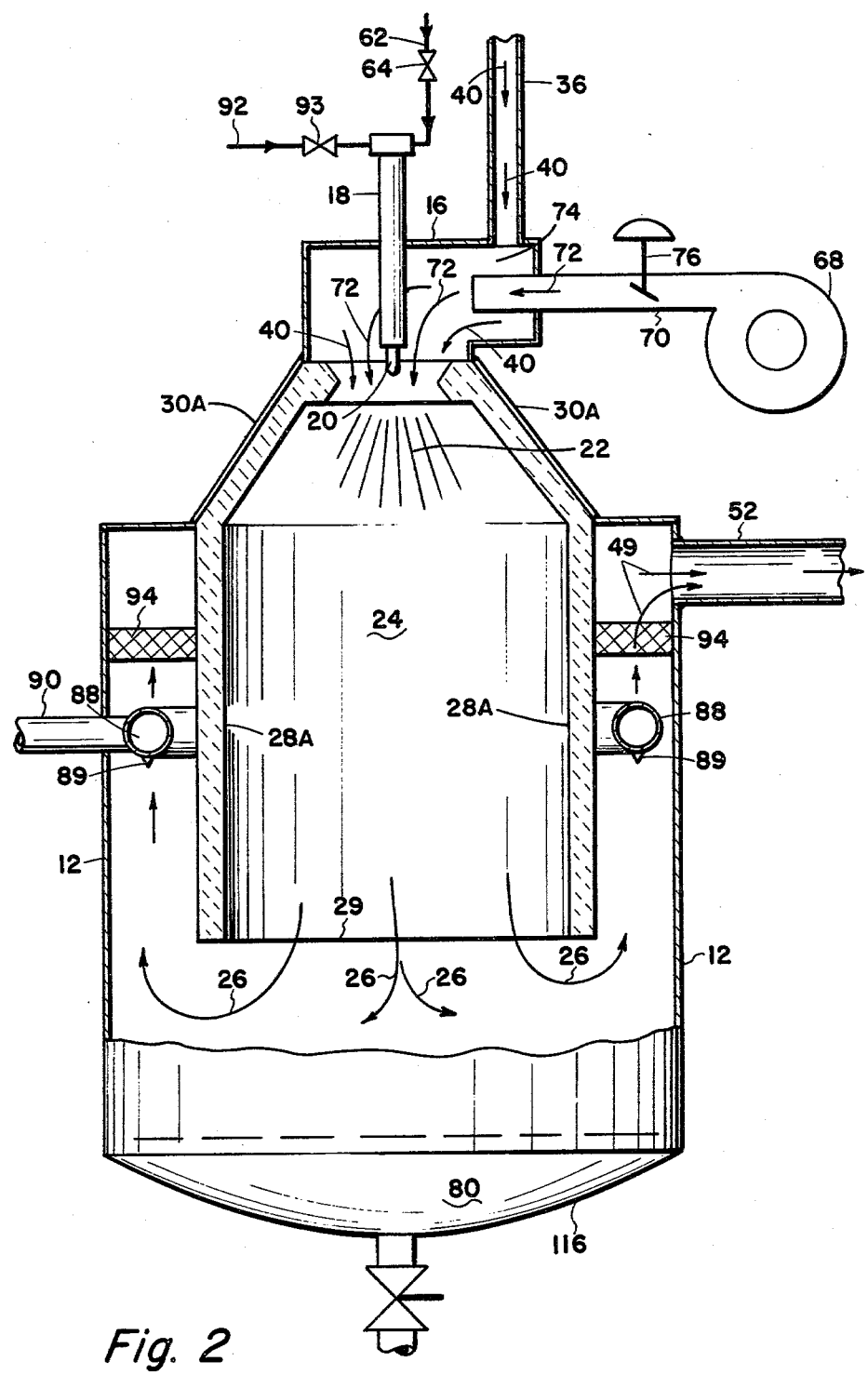
FIG. 2 illustrates a slightly modified embodiment of the invention.

The refractory wall 28A, which forms the boundary of the combustion chamber, can be made in a single piece with a tapering to portion 30A, as shown in FIG. 2, or can be made in two cylindrical pieces, one of larger diameter 28, and the other of slightly smaller diameter 30.

A fuel pump 18 and a fuel nozzle 20 are supplied with liquid fuel under pressure, over line 62, through a control valve 64, and line 66. The nozzle 20 is conventional, and is designed to atomize the liquid fuel, and to provide a downgoing conical spray 22 of fuel droplets coaxial with the refractory walls. Not shown is a means for igniting the fine droplets of liquid fuel, to provide a downwardly flowing flame 24, 26.

Steam may be provided through line 92 and controlled by valve 93, in order to provide the atomization of the liquid fuel, if necessary.

A combustion air plenum 16 surrounds the burner tube 18 and nozzle 20 and is supplied with combustion air from a blower means 68 of conventional design. The blower is connected to the plenum 16 by means of a pipe 70, and air flows into the space 74 inside of the plenum in accordance with arrow 72. If desired, water may be sprayed, through means 78, supplied by pipe 79 inside of the pipe 70, through which the combustion air flows. A control mechanism 76 can be provided to control the flow rate of combustion air to provide the desired minimum value of free oxygen in the products of combustion of the inert gas generator.

The steam boiler 32, having a flue gas conduit 34, is tapped to supply flue gas through pipe 36 in accordance with arrow 40. This fuel gas from the boiler generally has an oxygen content considerably higher than the minimum value, such as 4%, which is desired for the inert gas, to ensure that the oxygen content will be below the lower explosive limit. The oxygen content of flue gases from a boiler may be as high as 10% or more and, consequently, this excess oxygen must be consumed in the process of burning the liquid fuel.

The fuel gas flows in accordance with arrow 40 from pipe 36 into a plenum space 38 surrounding the upper refractory wall 30 of the combustion chamber 14. The flue gas flows in accordance with arrows 44 and 42 into the flame space 24, where the excess oxygen is consumed, so that the products of combustion indicated by the arrows 26, which flow out of the bottom end 29 of the refractory wall 28, flow upwardly in accordance with arrows 48, 49, in the annular space between the refractory wall 28 and the wall 12 of the vessel.

A ring manifold 88 has a plurality of nozzles 89 spaced around the bottom surface, spraying water downwardly, so as to continually wash, clean and cool the hot gases 26. The gas flow indicated by arrows 26 continue upwardly in accordance with arrows 48 where a demister 94, which closes off the annular space, removes excess liquid from the gases, which flow out in accordance with arrows 49 and 50, through pipe 52, to the tank or other device which is to be filled with this inert gas.

The water to manifold 88 is supplied through a pipe 90 and valve 91. On board ship the water can, of course, be sea water, which is collected in the bottom of the vessel 80, and is maintained at a selected level, and in accordance with the liquid-level control means 81 and 82, which are shown schematically, and which control a dump valve 84 in the pipe 86, permitting the water to flow in accordance with arrow 85, out of the bottom of the tank.

The control of the combustion in the boiler 32 is a difficult one, particularly if the demand for steam is a variable, as is usually the case. Consequently, it is almost impossible to control the oxygen content of the flue gases 41 to the desired minimum. Thus, the oxygen percentage may vary widely in the gases 40, which are flowed into the inert gas generator through the pipe 36. Thus, in order to provide the required minimum oxygen content, control of the flow of supplementary combustion air 72 from the blower 68 must be carefully controlled. It is desirable, therefore, to provide a means for determining the oxygen concentration in the outlet gases 50, by withdrawing some of that gas through a pipe 54 to an oxygen measuring means 56. Such a device 56 would be a commercially available instrument and no detailed description is desired.

Signals would be provided over output lines 58 and 60, for example, which would control independently the air controller 76 in the pipe 70, and also the liquid-fuel control valve 64. Thus, knowing the percentage of oxygen in the outlet gas 50, the inlet combustion air and inlet fuel can be controlled to maintain that oxygen content at the lower level that is desired.

Figure 4:
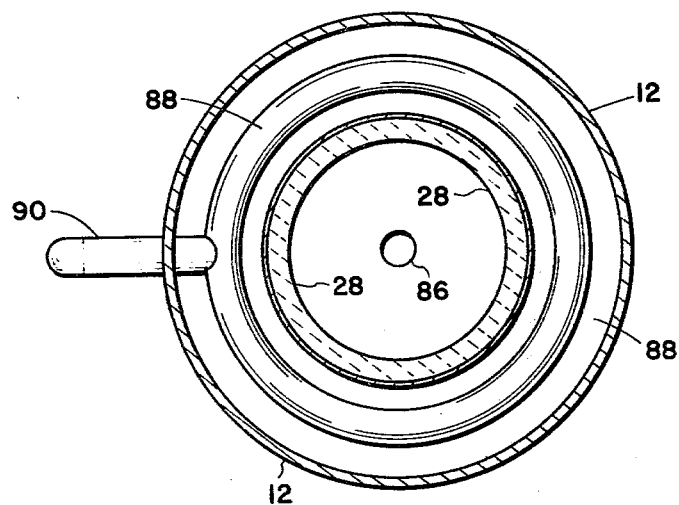
FIGS. 3 and 4 illustrate cross-sections taken across the planes 3—3 and 4—4, respectively, of FIG. 1.
Figure 3:
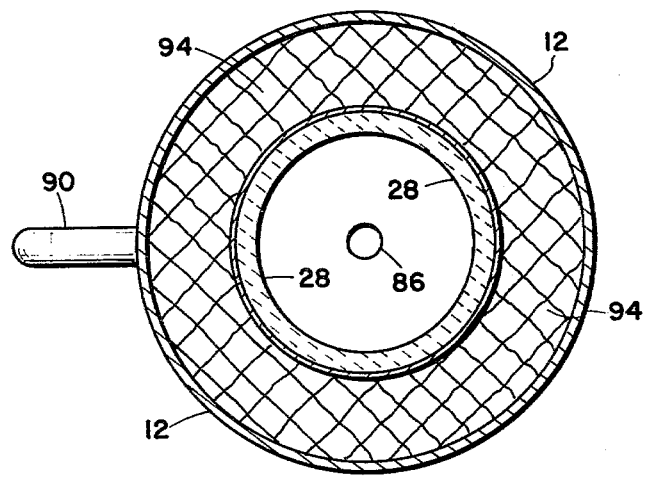

Referring briefly now to FIGS. 3 and 4, there are shown two cross-sections, taken respectively across the planes 3—3 and 4—4 of FIG. 1. Corresponding numbers are used on FIGS. 3 and 4 to those used in FIG. 1, and the drawings are self-evident. FIG. 3 is taken across a plane above the demister 94 and shows the demister and a cross-section through the refractory wall 23, and the outlet pipe 86.

FIG. 4 shows the cross-section through the refractory wall 28 and the outlet water pipe 86. Also, it shows the ring manifold 88 which supplies the sprays of water.

In FIG. 1 it was shown that the inlet pipe 36 for the flue gas went to a separate plenum space 38 and thereafter flowed into the flame area 24 through openings in the refractory wall surrounding the combustion zone.

Referring now to FIG. 2, there is shown a variation of FIG. 1, in which a single plenum 16 is provided and two pipes provide gases flowing into the plenum 16. Pipe 70, which comes from the blower 68, supplies the combustion air 72, which is controlled by the means 76. Then there is the pipe 36 carrying the flue gases 40, which, likewise, flow into the plenum, and from there both gases flow past the burner nozzles 20, through the open neck of the refractory wall 30A, and into the spray of liquid fuel 22 to provide combustion oxygen for the fuel, to provide the downgoing flame 24 as was explained in FIG. 1. Thereafter, the process is identical to that shown in FIG. 1 and no further explanation is required. Corresponding numbers are used to indicate corresponding parts.

For some services, and for various reasons, it may be preferred to completely burn only as little as 65% of the carbon and hydrogen of the hydrocarbon fuel. There is difficulty in this less-than-stoichiometric fuels burning, and varied special means for production of stable, but partial burning must be provided. Also, in this invention, precise air volume control and precise fuel control are required, as well as an especially-shaped burner refractory (28, 30). These special provisions are necessary to cause the unburned carbon of the fuel to exist in the form of carbon monoxide, rather than as carbon, per se, and as a readily-combustible gas. If carbon, as such, should be present in the combustion gases, there would be a smoking and sooting problem.

In addition to precise air and fuel control, and special shape, as shown, it is also necessary to maintain, as closely as possible, full combustion temperature for a selected time-period after burning is initiated. Provision for maintenance of this temperature within the selected combustion chamber volume is the refractory lining 28, 30, of the combustion chamber, and prior to any water-contact cooling, where the refractory resists combustion heat as well as insulating the combustion zone from a cooler zone.

In this invention, the precise air control applies only to air which is supplied by the blower 68. This is true because a specific quantity of oxygen is required for the burning of the fuel, and air is the most significant oxygen supplier, but because the excess oxygen of the flue gas, as variously admitted to the combustion zone, is also a supplier of oxygen for fuel burning, (and the $O_2$ can constitute as much as 10% of the flue gas) both the air supplied, and the flue gas provide the total quantity of oxygen, but the quantity of flue gas must vary as the boiler is firing-controlled for generation of varying quantities of steam such as may be required, and the oxygen content of the flue gases may vary widely, but meanwhile the oxygen content of the inert gas 50 must not exceed 4%. Because of this, and if the oxygen content of 40 is quite great, it is necessary, in that condition, to restrict air delivery to such a degree that the zone downstream of the liquid fuel atomizer is $O_2$-deficient in the system as shown in FIG. 1. But, in the system such as in FIG. 2, air control simply maintains not-more-than 4% $O_2$ in 50. However, both systems make use of flue gas for total volume of blanketing gases as at 50.

When the zone downstream of 20 is $O_2$ deficient, the unburned carbon is as CO and unburned hydrogen is as $H_2$. Both CO, and $H_2$, when at combustion temperature, will react and very rapidly combine with $O_2$ from HO for production of $CO_2$ and $H_2O$ in 26. In FIG. 2 the air plenum 16 has a mixture of air and flue gas for total $O_2$ supply. It is well known by those versed in the arts that a preferred maximum partial-pressure of $H_2O$ in 16 greatly accelerates burning of fuels. Since the $H_2O$ content varies widely as atmospheric humidity changes in air, the element 78 is added for control of the $H_2O$ partial-pressure within 74 to an optimum condition. Either finely atomized water, or water vapor, provide humidity control at 78. In FIG. 2, the water-vapor content of the flue gases 40 provides ample $H_2O$ partial-pressure within 74, because 74 is a mixture of air and flue gas.

The fuel oil burner 20 in both systems of FIGS. 1 and 2 must be capable of extremely fine atomization of the liquid oil fuel 62. Under some special conditions this degree of atomization is possible with pressure-atomization. However, a preferred means for atomization of 62 is by the action of a steam, or steam atomization. Steam atomization has been virtually universally adopted, but pressure atomization can be used.

Inert gases 50, as they exit at 52, have been water-spray-cooled to approximately 400° F., partially cleaned, and demisted. It is typical to further treat 50 prior to use as blanketing gases, but this is by well-known methods, and is outside the field of this invention.

This invention has been described for convenience in terms of an inert gas generator, which would be used on board a tanker so that, as the liquid fuel is pumped from the tanks, the inert gas can be used to take up its space and to exclude air from the space being vacated in the tank. In such a case, sea water would be used for the spray that cools and washes the combustion gases. Also, because of the boilers available on the ship, it would be convenient to use the flue gases from a boiler to provide the major part of the inert gases and the liquid fuel and combustion air would then simply supplement the inert gases in the flue gas and serve to reduce the oxygen content to the required minimum value.

In other applications the products of combustion could be taken from large internal combustion engines, for example, which might be available. Also, on land, gaseous fuel could be used in place of liquid fuel, if desired.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element or step thereof is entitled.

It is claimed:

1. Apparatus for use in conjunction with boiler flue gases for generating low oxygen contents inert blanketing gases, comprising:
   (a) Combustion chamber means, and means to supply controlled fuel to a burner means to form a downflowing flame, in said combustion chamber;
   (b) means to supply boiler flue gases to said combustion chamber;
   (c) means to supply controlled air to said combustion chamber;
   (d) means to flow the products of combustion of said flame upwardly in an annular space between said combustion chamber and the wall of a containing vessel;
   (e) means to provide a downgoing spray of water, counter-current in said annular space to cool said upflowing products of combustion, to form cooled inert exit gases;
   (f) means to monitor the percentage of oxygen in said inert exit gases; and means to control the supply of fuel, and the supply of air responsive to said oxygen monitor.

2. The apparatus as in claim 1 in which said combustion chamber is enclosed within a refractory wall.

3. The apparatus as in claim 1, in which said fuel is a liquid, and including means to atomize said liquid fuel.

4. The apparatus as in claim 3 including means to supply steam to atomize said liquid fuel.

5. The apparatus as in claim 1 including demisting means inside said annular space to remove liquid droplets from said cooled, inert exit gases.

6. The apparatus as in claim 1 in which said means to supply combustion air comprises;
 (a) combustion air plenum means upstream of said combustion chamber;
 (b) air blower means to provide air at selected pressure to said air plenum; and
 (c) means to control the flow of combustion air from said blower means to said plenum.

7. The system as in claim 6 including means to flow said flue gases to said air plenum with said combustion air.

8. The system as in claim 6 in which said flue gases are supplied to said combustion chamber downstream from said burner means.

9. The apparatus as in claim 1 including liquid-level control means to control the water level from said water spray in the bottom of said containing vessel.

10. The apparatus as in claim 8 including means to supply atomized water droplets to said combustion air prior to entry into said air plenum.

* * * * *